Patented Sept. 23, 1952

2,611,682

UNITED STATES PATENT OFFICE 2,611,682

METHODS OF RECOVERING HYDROGEN SULFIDE FROM SULFIDE CONTAINING SODA LIQUORS OBTAINED IN CELLULOSE PRODUCTION

Nils Viktor Mannbro, Fredriksberg, Sweden

No Drawing. Application December 4, 1950, Serial No. 199,156. In Sweden December 7, 1949

4 Claims. (Cl. 23—181)

The present invention relates to a method of recovering hydrogen sulfide from sulfide containing soda liquors obtained in cellulose production and is particularly concerned with the recovery of sulfur as hydrogen sulfide from sulfite waste liquor, which has been introduced into the sulfate cellulose process, but is not exclusively limited thereto, as examples of other applications will be mentioned hereinafter.

In such cases where a sulfite cellulose plant and a sulfate cellulose plant are situated in the same locality, there are certain possibilities of utilizing the sulfite waste liquor in the sulfate cellulose process. It has been proposed for instance to subject the solid content of the sulfite waste liquor to combustion together with black liquor formed in the sulfate process, after removing the calcium from the sulfite waste liquor, for instance by precipitation as calcium carbonate by addition of sodium carbonate. About 80 kilogrammes of sulfur for every metric ton of pulp are carried away from the sulfite plant in the sulfite waste liquor and are obtained after combustion in this manner together with the black liquor mainly as sodium sulfide in the soda smelt and thus it is possible to recover this sulfur and return it to the sulfite cellulose plant. Most simply this is effected by introducing carbon dioxide in the soda liquor and oxidizing the resulting hydrogen sulfide to sulfur dioxide.

It has been proposed previously to introduce carbon dioxide into a solution of the salt smelt obtained in regeneration of sulfite waste liquor with Na base, whereby sodium bicarbonate and at the same time hydrogen sulfide are recovered. The hydrogen sulfide is subjected to combustion to sulfur dioxide and is employed for preparing cooking acid in the sulfite cellulose plant. The precipitation of bicarbonate is necessary in order to make possible the preparation of a pure Na cooking acid. In the case where Ca cooking acid is employed for the sulfite cellulose digestion and the sulfite waste liquor obtained is subjected to combustion together with black liquor in the sulfate cellulose process, it is not desired to precipitate the sodium bicarbonate as the liquor from which the hydrogen sulfide has been recovered is to be utilized in the normal manner to prepare cooking liquor for sulfate cellulose production.

It is not necessary to recover the comparatively cheap Ca base in the sulfite cooking acid. If for some reason it is desired to recover this base, however, this is accomplished by special procedures before the introduction of the sulfite waste liquor into the sulfate cellulose process.

The object of the present invention is to recover hydrogen sulfide from the soda liquor with the use of diluted carbon dioxide gases, preferably flue gases, in such a manner that the soda liquor thus treated may be employed directly in the sulfate cellulose process and the resulting hydrogen sulfide may be oxidised to a sulfur dioxide gas sufficiently concentrated to be used in the sulfite cellulose plant. If the flue gases obtained from the soda furnaces are employed without any especial precautions, it is impossible to obtain a gas containing more than about 6% $SO_2$. By combustion of pure hydrogen sulfide in air on the other hand, a gas containing a maximum of 15% $SO_2$ may be obtained after condensation of the water vapor.

The problem of producing $H_2S$ without dilution was studied in laboratory experiments and it was established that the pH value decreases to about 9.5 during the absorption of the carbon dioxide, before any substantial amounts of hydrogen sulfide are expelled from the liquor.

In accordance with this invention it is proposed to take advantage of this fact and carry out the absorption of carbon dioxide in an absorption tower in such a manner that practically the total amount of carbon dioxide introduced is absorbed in the tower, but practically no hydrogen sulfide is expelled in the tower. Thus, the gases withdrawn at the top of the tower will be practically free from both carbon dioxide and hydrogen sulfide, and the total sulfur content of the soda liquor is recovered in the liquor withdrawn from the tower. The sulfur is present in this liquor as hydrogen sulfide and may easily be expelled from the liquor to obtain a concentrated hydrogen sulfide gas suitable for combustion to a sulfur dioxide gas having the required concentration for preparation of sulfite cooking acid. The above mentioned effect is obtained by properly adjusting the ratio of the amount of gas introduced at the bottom of the tower to the amount of soda liquor introduced at the top of the tower. In this manner the pH value in the upper part of the tower may be maintained below the above-mentioned value of about 9.5, whereby no hydrogen sulfide is expelled in this part of the tower. When the absorption tower is operated in this manner there is at the bottom of the tower a zone where the carbon dioxide content of the soda liquor is so great that it does not absorb any more carbon dioxide under the prevailing conditions. The carbon dioxide introduced with the flue gas or other carbon dioxide containing gas passes through this zone without being absorbed, but is absorbed in a zone lying immediately above the first-mentioned zone. A certain amount of hydrogen sulfide is carried upwards with the carbon dioxide containing gas from the lowest zone of the tower. This hydrogen sulfide is, however, reabsorbed in the part of the tower lying above the zone where the carbon dioxide is absorbed because of the pH value being above 9.5 in this part of the tower. The remaining gas leaves the tower practically free from both carbon dioxide and hydrogen sulfide.

By regulating the quantity of carbon dioxide introduced into the tower a desired quantity of sulfide may be allowed to remain in the soda liquor or a soda liquor totally free from sulfides may be obtained. The introduction of carbon dioxide should not, however, be allowed to increase to such a rate that sodium bicarbonate is precipitated in the absorption tower or in subsequent treatment of the liquor to expel the hydrogen sulfide.

The soda liquor is removed from the bottom of the tower that is from the zone where the soda liquor has absorbed the maximum amount of carbon dioxide. To expel the hydrogen sulfide from this soda liquor it is preferably injected hot into a vacuum chamber or a container having a lower pressure than the absorption tower, which may be operated at a pressure above atmospheric. The volume of air required for the combustion of the hydrogen sulfide may be totally or in part introduced through this chamber, thus facilitating the removal of the hydrogen sulfide and at the same time improving the circulation. In experiments there was obtained in this manner a mixture of 14% hydrogen sulfide in air, which may be directly burnt to sulfur dioxide.

In accordance with a previously proposed process of utilising sulfite waste liquor in the sulfate cellulose process the soda smelt is dissolved in sulfite waste liquor. In this connection the possibility of expelling hydrogen sulfide from the soda liquor with the aid of flue gases has been pointed out. It has now been found that also soda liquor prepared from sulfite waste liquor is particularly suited to the recovery of $H_2S$ in accordance with the above described process, since no precipitation of sodium bicarbonate has been observed in it even after the sulfide has been completely removed.

The invention will be further described in the following examples of processes which are facilitated or made possible by this invention.

Example 1

In those cases where Ca or Na sulfite waste liquor, particularly Ca sulfite waste liquor, is introduced in some manner into the sulfate process and the sulfur content of the sulfite waste liquor is obtained as sulfide in the soda smelt, that amount of sulfur which is not necessary for a favorable realization of the sulfate cellulose digestion, may be returned to the sulfite cellulose process as sulfur dioxide. The soda smelt is dissolved in a normal manner in weak liquor or in sulfite waste liquor. The resulting solution is treated with carbon dioxide in accordance with the above described process.

Example 2

In neutral sulfite digestion of cellulose, cooking liquor is produced by introducing sulfur dioxide in a soda liquor. When the sulfur dioxide is introduced, however, the sulfide content of the soda liquor gives rise to sulfur compounds such as thiosulfate, which are injurious to the subsequent cellulose cooking. In accordance with the process of this invention the soda liquor may be treated with carbon dioxide before the introduction of sulfur dioxide to remove the sulfur content of the liquor. The sulfur dioxide obtained by combustion of the resulting hydrogen sulfide may thereupon be introduced in the soda liquor obtained to produce the neutral cooking liquor.

Example 3

In the precipitation of alkali lignin from black liquor by introducing sulfur dioxide an acidic filtrate is obtained which contains unprecipitated lignin and sodium sulfite and other sulfur compounds. If the filtrate is evaporated after neutralization and subjected to combustion together with black liquor, the main part of the content of the filtrate is obtained as sulfide in the soda smelt and may be recovered as sulfur dioxide according to this invention.

Example 4

It is known that cellulosic material including inferior wood waste and agricultural wastes, by pre-hydrolysis and subsequent sulfate digestion may give a pulp, which may be worked up to a high quality rayon pulp. If this pre-hydrolysis is carried out with aqueous sulfur dioxide the hydrolysate may after direct recovery of excess sulfur dioxide, be utilized in the sulfate cellulose process. Preferably, the hydrolysate should be neutralized with alkali and employed to wash out remaining liquor from the calcium carbonate sludge or lime sludge obtained in the causticization before it is employed as a solvent for the soda smelt. The resulting soda liquor is causticized and employed to cook sulfate cellulose. The sulfur content of the hydrolysate and other solids are thus recovered as sulfides after combustion of the black liquor. After the soda smelt has been dissolved in fresh hydrolysate the sulfur dioxide may be recovered by the process of this invention and be used to prepare a fresh hydrolysis liquid. Due to unavoidable losses of sulfur a certain quantity of sulfur must of course be added to the system.

Example 5

In conventional combustion of concentrated sulfite waste liquor the $SO_2$ and $SO_3$ content of the flue gases give rise to air pollution problems. By washing the flue gases with sulfide-free soda liquor these sulfur compounds may be recovered and introduced into the sulfate cellulose process, where they will be found as sulfides in the soda smelt. A portion of the soda liquor produced from the soda smelt may be utilized to produce a sulfide free soda liquor suitable for the washing of the flue gases, hydrogen sulfide being simultaneously expelled and burnt to sulfur dioxide and returned to the sulfite plant. In the washing of the flue gases any accompanying ash is recovered and may, in accordance with its nature, be utilised in the sulfate cellulose process.

Having now particularly described the nature of my invention and the manner of its operation what I claim is:

1. A method of recovering hydrogen sulfide from a sodium sulfide and sodium carbonate containing solution of soda smelt resulting from the regeneration of sodium containing cellulose waste liquors, which comprises passing the solution and a carbon dioxide containing gas in counterflow through an absorption tower and adjusting the ratio of the amount of carbon dioxide containing gas introduced to the amount of solution introduced in such manner that hydrogen sulfide liberated in the lower part of the tower is reabsorbed in the top part of the tower by the sodium carbonate of the freshly introduced solution, withdrawing a gas mixture substantially free from both carbon dioxide and hydrogen sulfide at the top of the tower, withdrawing at the bottom of the tower an acidified liquor containing substantially the total amount of sulfur of the solution introduced, and recovering hydrogen sulfide from said acidified liquor in a subsequent step.

2. A method of recovering hydrogen sulfide from a sodium sulfide and sodium carbonate containing solution of soda smelt resulting from the regeneration of sodium containing cellulose waste liquors, which comprises passing the solution and a carbon dioxide containing gas in counterflow through an absorption tower and adjusting the rate of introduction of carbon dioxide containing gas in proportion to the rate of introduction of the solution in such manner that the pH of the solution in the top part of the tower does not fall below about 9.5, so that the total amount of carbon dioxide introduced is absorbed in the tower, but no hydrogen sulfide is expelled from the tower, withdrawing a gas mixture substantially free from both carbon dioxide and hydrogen sulfide at the top of the tower, withdrawing at the bottom of the tower an acidified liquor containing substantially the total amount of sulfur of the solution introduced, and recovering hydrogen sulfide from said acidified liquor in a subsequent step.

3. A method as claimed in claim 2, wherein the acidified liquor withdrawn from the bottom of the tower is subjected to the action of a vacuum in order to recover the hydrogen sulfide.

4. A method as claimed in claim 3, wherein the hydrogen sulfide obtained is subjected to combustion with air to sulfur dioxide.

NILS VIKTOR MANNBRO.

REFERENCES CITED

The following references are of record in the file of this patent:

UNITED STATES PATENTS

| Number | Name | Date |
|---|---|---|
| 1,523,845 | Sperr | Jan. 20, 1925 |
| 1,523,872 | Hall | Jan. 20, 1925 |

FOREIGN PATENTS

| Number | Country | Date |
|---|---|---|
| 4,922 | Great Britain | of 1886 |
| 113,435 | Germany | Aug. 15, 1900 |
| 345,873 | Great Britain | Apr. 2, 1931 |